Jan. 14, 1930.  A. H. JESSEN  1,743,781
TRANSMISSION
Filed Nov. 14, 1925  2 Sheets-Sheet 1
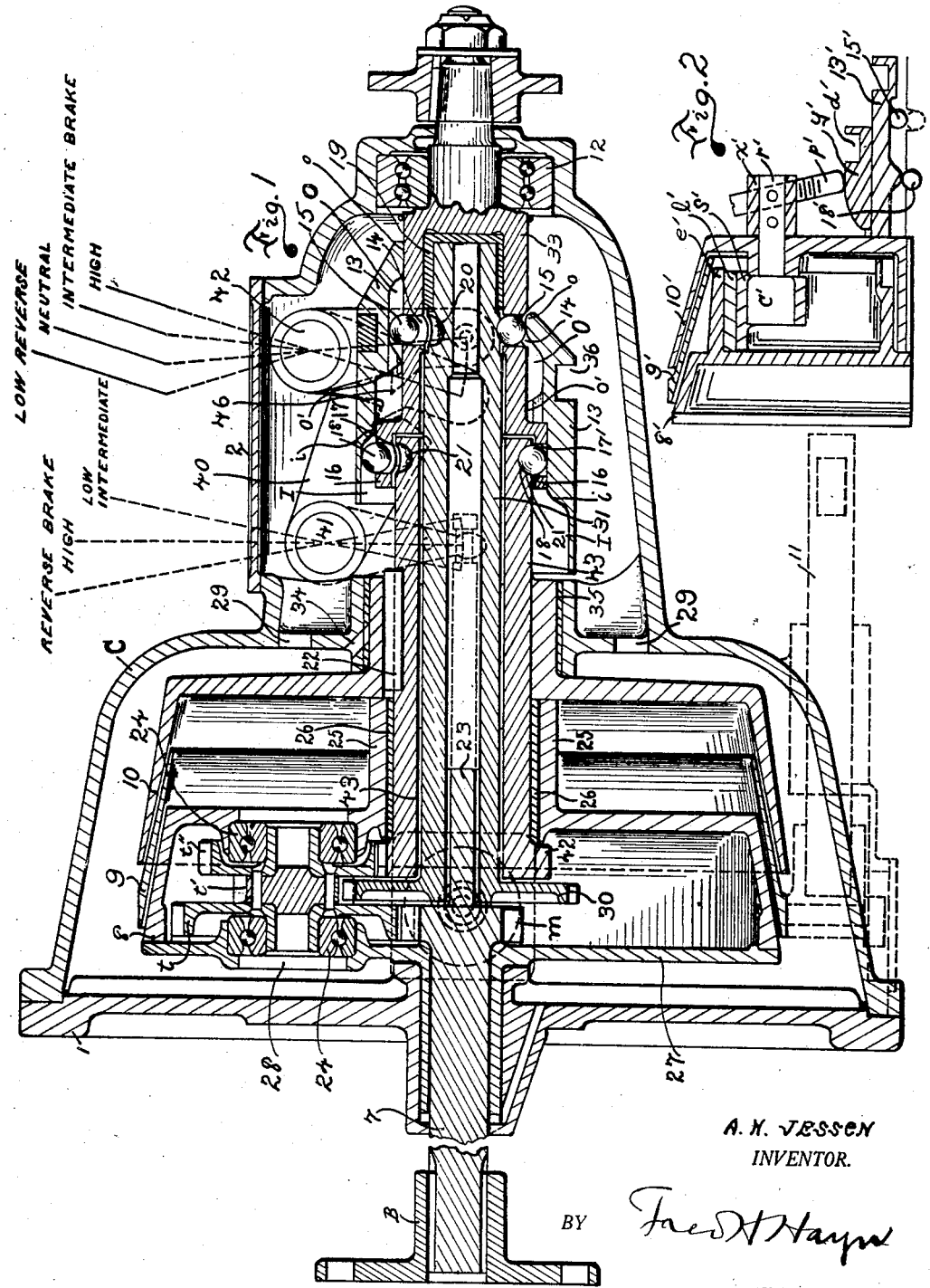
A. H. JESSEN
INVENTOR.
BY
ATTORNEY.

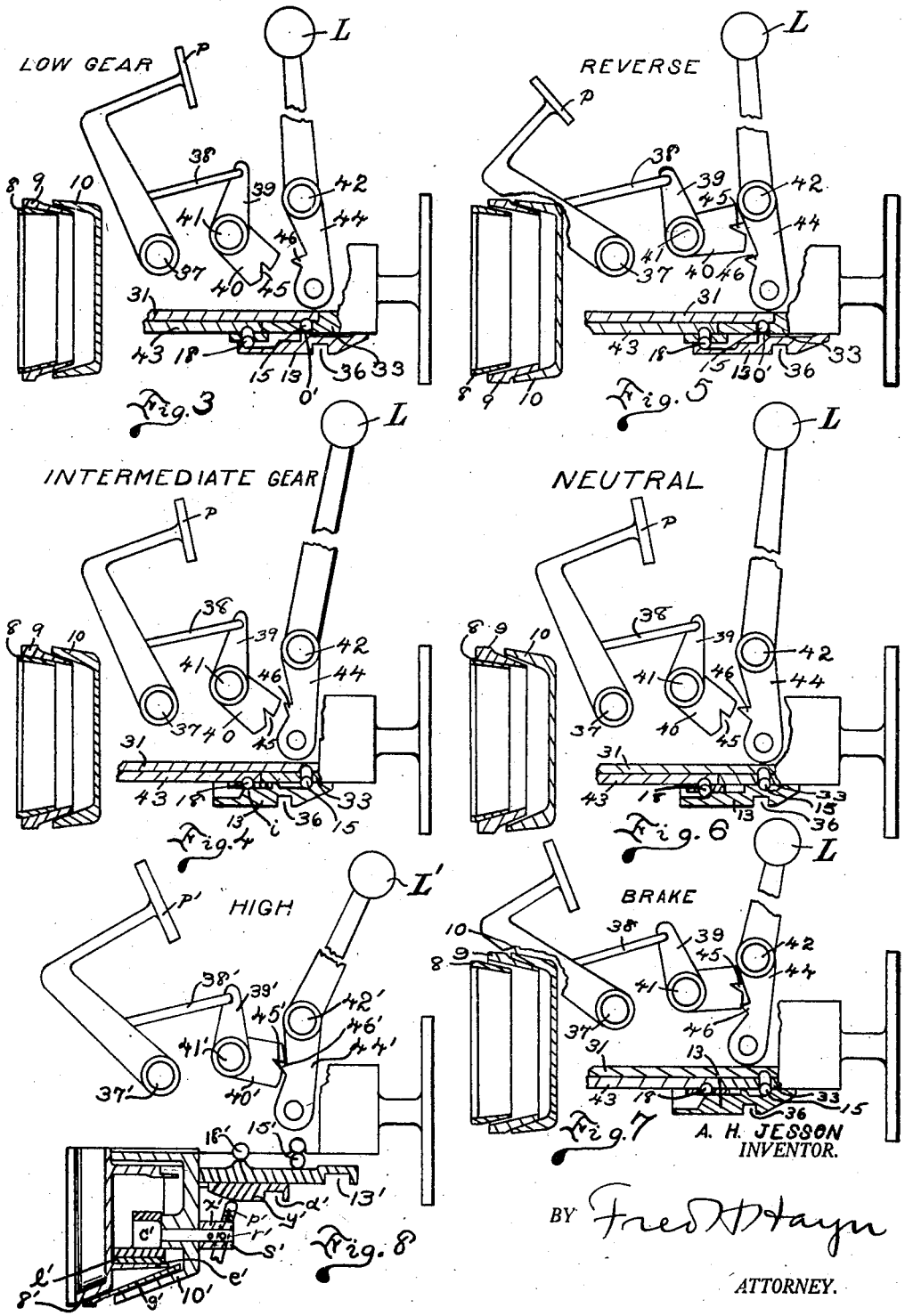

Patented Jan. 14, 1930

1,743,781

UNITED STATES PATENT OFFICE

ARNOLD H. JESSEN, OF LOS ANGELES, CALIFORNIA

TRANSMISSION

Application filed November 14, 1925. Serial No. 69,140.

My invention relates to transmission mechanisms in general, and more particularly to those used in connection with motor vehicles, or any mechanism in which it is desired to provide for changes in speed, increased or decreased, a reverse movement by means of planetary action, as well as a brake application thereof.

It accordingly is an object of my invention to provide a set of members, preferably in the shape of conical drums, one of which comprises a planet carrier and has associated therewith a set of planet pinions adapted to coact with sun gears positioned on drive and driven shafts actuated at predetermined selective speeds, three or more in number, to provide for acceleration or reduction in speed, to provide for reverse movement, and also to make effective brake application when required.

Another object of my invention is to provide a novel form of clutch member associated with my improved transmission mechanism, said clutch member being preferably of the slidable type, and having associated therewith sets of devices for rendering said clutch member effective for locking and unlocking certain appliances associated with said transmission mechanism, said devices comprising a set of cams and cam surfaces, and a set of locking members adapted to coact therewith, said devices being in the form of suitably constructed balls.

It is also within the province of my invention to equip one of the conical members associated with my improved transmission mechanism with a brake application means, preferably in the shape of a brake drum adapted intermittently to be operated by a set of devices associated with my improved clutch.

It is also within the province of my invention to provide a set of novel appliances associated with one of the pedals of a motor vehicle and a lever, which appliances are also associated with my novel form of clutch, to render the same operative as desired or needed.

A still further object of my invention is to provide a novel form of transmission mechanism which is simple in character, durable, thoroughly efficient and reliable in operation, easy and inexpensive to manufacture, not easy to get out of order, composed of a minimum number of parts, and one which will effectively produce the objects intended.

Further objects and advantages of my invention will become more apparent as the description thereof proceeds.

Reference is had to the accompanying drawings, in which similar reference characters denote similar parts. In the drawings, Fig. 1 is a longitudinal sectional view of my improved transmission mechanism, certain parts of the clutch member being shown in different positions, the different positions of the operating members for said clutch being shown in dotted lines, Fig. 2 is a fragmentary cross sectional view of a modification in which a brake drum is associated with one of the conical members of my invention, Fig. 3 is a fragmentary cross sectional, and more or less diagrammatic showing of the conical members, and the positions they occupy, and the operating devices for the clutch when the transmission mechanism is being operated in low gear, Fig. 4 is a similar view showing the various parts when the mechanism is being operated at intermediate speeds, Fig. 5 is a similar view showing the parts in the position for reverse movement, Fig. 6 is a similar view showing the position of the various parts when the mechanism is in neutral position, Fig. 7 is a similar view illustrating the position of the various parts when brake application is made, and Fig. 8 is a similar view of the various parts as applied to the modification shown in Fig. 2.

Describing my invention more in detail, it is my object to provide a novel form of transmission mechanism more especially adapted to be used in connection with motor vehicles, but it is by no means to be limited to such, for in practice it may be used in connection with line shafting and the like, and wherever and whenever any change of speed, as well as a reverse movement or brake application are required.

As seen more particularly in Fig. 1, I provide a casing C equipped with removable covers 1 and 2 associated with said casing in any manner found in practice to be desirable, for the purpose of providing access to the parts and for the purpose of dismantling.

Suitably journaled within the cover 1 is a motor drive shaft 7 also journaled within a bearing B associated with the universal joint of the vehicle, or with any other support, depending upon the structure with which my invention is associated. Positioned within the casing or housing C is a set of cones or conical members 8, 9, and 10, the cone or conical drum 10 comprising an intermittently revolving and stationary member, to be operated in the manner presently to be described. The conical drum 9 comprises a pedal operated stationary drum, that is to say it does not rotate, but may intermittently be actuated by the conventional arms 11 shown in dotted lines in Fig. 1, which however forms no part of my invention, and any other suitable operating mechanism may be substituted therefor. The drum 8 or planet carrier is intermittently revolving, and houses the planet pinions $t$, $t'$, $t''$ which also may be of conventional form, and which will presently be more particularly described.

The shaft 33 is the driven shaft, said shaft being driven through the transmission mechanism by the drive shaft 7, operated by the engine or motor associated with the vehicle or any other shaft the speed of which is desired to be transmitted to the shaft 33, and means for coupling the shaft 7 with said motor being provided. The driven shaft 33 turns in suitable bearings 12, preferably of the ball type, though any other form may be substituted therefor. A slidable clutch 13 is adapted to slide on the shaft 33, which shaft is equipped with circumferentially arranged cavities or depressions 14 of any preferred number, in which are positioned balls or other devices 15, said shaft 33 being tubular at its inner end, and equipped with an offset tubular portion 16, which portion is also provided with cavities 17 similar to the cavities 14 and containing balls or other devices 18.

A tubular low gear shaft 31 has one end reduced so as to accommodate a wear bushing or cup 19 constructed of any preferred material, and said reduced end is provided with a set of cavities 20, circumferentially arranged, to accommodate the balls or other devices 15. Surrounding the low gear shaft 31 is a tubular intermediate gear shaft 43, which shaft is equipped with a set of circumferentially arranged cavities or depressions 21 to accommodate the balls 18, said shaft 43 terminating within the tubular offset end 16 of the driven shaft 33. The intermediate gear shaft 43 is keyed to the conical drum 10 by means of the key 22.

Either integral with the low gear shaft 31, or associated therewith in any manner preferred, is a low drive sun gear 30 having any preferred number of teeth, but of a number to mesh with the teeth of the intermediate planet pinion $t'$. The dive shaft 7 is equipped with a main drive pinion $m$, and a stub shaft 23, preferably integral with the drive shaft 7 is journalled within the tubular low gear shaft 31. Associated with the tubular intermediate gear shaft 43, and preferably integral therewith, is an intermediate drive sun gear 42, in mesh with the inner intermediate planet pinion $t''$, suitable ball bearings, if desired being provided for all the gears. Such ball bearings are indicated at 24.

The cone 8 is equipped with a tubular being provided for all the gears. Such ball shaft 43, a wear bushing 26 being positioned in between, and the planet pinions $t$, $t'$ and $t''$ are positioned within said cone or conical member or planet carrier 8, a closure 27 being provided on the casing or housing C, which closure is equipped with openings 28 to permit a thorough lubrication of the parts and bearings. Suitable passages 29 in said casing are also provided for the same purpose. Said casing and the wear bushing 35 may also be equipped with one or more holes 34 for a similar purpose.

The slidable clutch 13 is provided with a cut-away portion or groove 36 to receive the embracing end of an operating lever L, or said end may be pivoted thereto or otherwise associated therewith as in practice preferred. Said clutch is also equipped with an outer clutch cam $o$, and a middle clutch cam $o'$, an inner clutch cam $i$ being also positioned thereon. Juxtaposed to said cams are cut-away portions forming an outer clutch cam surface O, and inner clutch cam surface I, which cams and cam surfaces are adapted to coact with the balls 15 to lock and unlock the various gear shafts in the manner presently to be described.

The lever or other manually operated device L is pivoted at 42 to an operating element or link 44, equipped with a suitable projection 46, intermittently adapted to engage with a notch or other device 45 formed in the member 40 of a toggle 41, the member 39 of which has pivoted thereto a link or other connection 38 secured in any preferred manner to the arm of the pedal P.

As hereinbefore explained, the drum or planet carrier 8 houses the planet pinions, and is intermittently revolving and stationary. The drum 9 is the brake drum, operated by the brake pedal only and through the connection 11. The drum 9 is stationary until moved by the brake pedal to apply a braking action between said drum and the drum 10. Bringing the drums 8 and 9 into contact provides for low gear operation. This is also true of intermediate gear operation, and neutral position, when the shafts are all free. Bringing the drum 9 into contact with the drum 10 also provides for reverse movement, the action of the clutch, pedal P and lever L for this purpose to be presently explained. In the form shown in Fig. 1, high speed is attained by causing the drums 8 and 10 to revolve, also to be presently described.

Low gear

With the balls 15 of the clutch in engagement with the cavities 14, the middle clutch cam $o'$ in engagement with said balls, movement is maintained from the driven shaft 33, the drum 10 revolving, to the motor drive shaft 7, through the main pinion $m$, planet pinion $t$, which rotates with planet pinion $t'$, low drive sun gear 30, tubular low gear shaft 31, clutch cam $o'$, and driven shaft 33, the drum 8 being stationary. The position of the parts is diagrammatically indicated in Fig. 3.

Intermediate gear

Drum 8 stationary, drum 10 revolving. The parts in position as indicated in Fig. 4. The movement is maintained between motor drive shaft 7, main drive pinion $m$, planet pinion $t$ ($t'$, 30 and 31 inactive) planet pinion $t''$, intermediate drive gear 42, tubular intermediate gear shaft 43, inner clutch cam $i$, and driven shaft 33.

Reverse

Middle clutch cam $o'$ holds the driven shaft 31 locked to shaft 33, shaft 43 free, pedal P causes drum 9 to engage drum 10, being thus held stationary, drum 8 revolving in reverse direction shown when high gear is in operation, the planet pinions $t$, $t'$ and $t''$ having a planetary action, the pinions driving about the sun gear 42 to rotate the gear 30, so that the shaft 31 will rotate shaft 33 in reverse direction. The position of the parts is shown in Fig. 5.

High gear

When the form of invention shown in Fig. 1 is used, high speed gear is maintained between drive shaft 7, main drive pinion $m$, direct drive to driven shaft 33, the drums 8 and 10 revolving, the clutch cams $o$ and $i$ locking the balls 15 and 18 in position to lock the shafts 31 and 43. The pedal P and the clutch lever 37 in this case are in engagement by means of the projection 46 and notch 45.

Neutral

In this case the clutch balls are positioned within the cam surfaces I and O, the drum 9 engaging the drum 8, which is held stationary, the drum 10 revolving the gear 42 with its shaft 43, planet pinions $t$, $t'$, $t''$, and the shaft 7.

Brake

The pedal P causes the drum 9 to hold the drum 10 stationary, the clutch cam $i$ locks the shaft 43 to the shaft 33, the drum 8 revolving with the planet pinions through the sun gear 42 shaft 43 and shaft 33.

In the form shown in Fig. 2, I have provided a form of my invention in which it is possible to obtain a high speed gear shift no matter what position the balls or gears may be in, by a simple manipulation. This feature is attained in the previously described form of my invention by placing the conical drums 8 and 9 in locked engagement. This form of my invention operates well in practice, but not quite so automatic as the form shown in Figs. 2 and 8.

In this form of my invention I have again provided the three conical drums 8', 9', and 10'. The drum 8' however, housing the planet pinions, is of a modified construction, having integral therewith a tubular extension $e'$ in which is positioned a more or less conventional brake drum construction. A pair of conventional brake shoes $s'$ provided with the usual springs for resisting the movement of the locking cams $c'$, which may be of conventional form, such as commonly associated with the brakes on the rear wheels of a motor vehicle, but are actuated in a novel manner, and by a novel construction. The brake shoes $s'$ are equipped with the usual brake lining $l'$ to provide engagement with the tubular extension $e'$ when the drums 8' and 10' are brought into contact. This permits a movement in high gear, and a direct drive between the shafts 7 and 33.

The cam $c'$ is either integral with or associated in any manner preferred with an operating rod $r'$, associated in any preferred manner with the sleeve $x'$. Adjustably associated with said sleeve, and screw-threaded for this purpose, is a trip cam pawl $p'$ adapted to be engaged and operated for a twisting movement by the cam $y'$, said pawl having its cam engaging end rounded for this purpose. By moving the clutch 13' toward the drums by any means in practice preferred, the cam $y'$ will engage with the pawl $p'$, causing a twisting action of the rod $r'$, and hence a turning of the cam $c'$. This action will cause the brake shoes $s'$ to engage through its brake lining with the tubular extension $e'$, bringing the drums 8' and 10' into engagement, the pawl $p'$ entering the groove or depression $d'$, and thus locking the drums 8' and 10' together, irrespective of the position of the balls 15' and 18'. It will of course be understood that the upper half only of this form of my invention, and removed from the casing, has been illustrated. The remaining construction of this form of my invention is precisely the same as that hereinbefore described.

In Fig. 8, the pedal P' with its pivot 37', link 38' toggle 41', with its members 39' and 40' and the notch 45' are precisely the same as previously described. The lever L with its pivot 42', member 44' and projection 46' are also the same. The remaining construction is precisely that as described in connection with Fig. 2, the lower half merely being illustrated.

While I have thus described my invention with great particularity, it will be obvious that the same may be modified throughout a wide range. I accordingly do not propose to be limited to the exact details of construction shown and described, but reserve the right in practice to make any and all modifications thereof that fall within the scope of the appended claims.

I claim as my invention:

1. In a transmission mechanism, a driving shaft having a pinion thereon, means for connecting said shaft to a source of power, a planet carrier having three interconnected planet pinions, one of which meshes with the pinion on the driving shaft, two sun gears meshing with the other planet pinions, braking means for controlling the rotation of said planet carrier or one of the sun gears, a driven shaft, and ball clutches for connecting either of the sun gears to the driven shaft.

2. In a transmission mechanism, a driving shaft adapted to be driven by a source of power, a pinion on said driving shaft, a conical planet carrier having three interconnected planet pinions, one of which is in mesh with said pinion, two sun gears in mesh with the other planet pinions, a conical brake drum for controlling the rotation of said planet carrier, concentric tubular shafts adapted to be selectively driven by said sun gears, a third conical drum keyed to the outer of said tubular shafts, a driven shaft, clutch means for selectively connecting said tubular shafts to said driven shaft, and means associated with said brake drum for selectively controlling the rotation of said planet carrier or said third drum.

3. In a transmission mechanism, a driving shaft having a pinion thereon, said shaft being adapted to be driven by a source of power, a planet carrier having three interconnected planet pinions, one of which meshes with the pinion on said driving shaft, said planet carrier having also a tubular extension thereon, braking means, two concentric tubular shafts adapted to be rotated within said extension, a sun gear on each of said tubular shafts meshing with the other of said pinions, a drum keyed to the outer of said tubular shafts, a driven shaft, a slidable clutch means for connecting either of said tubular shafts with said driven shaft, and means for operating said braking means so that it will selectively control the rotation of said planet carrier or said drum.

4. In a transmission mechanism, a driving shaft, a pinion on said shaft, a set of concentric tubular shafts in alignment with said driving shaft, a driven shaft in alignment with said tubular shafts, sun gears on two of said tubular shafts, a planet carrier mounted on the outer of said tubular shafts, said planet carrier having three interconnected pinions, one of which is in mesh with the pinion on said driving shaft, the other of said pinions meshing with said sun gears, a transmission drum keyed to the outer of said tubular shafts, a longitudinally shiftable braking means, said means being adapted selectively to control the rotation of said planet carrier or said transmission drum, and a longitudinally movable clutch surrounding said driven shaft and said outermost tubular shaft for connecting either of said shafts to said driven shaft.

5. In a transmission mechanism, a drive shaft adapted to be actuated by a source of power, said drive shaft having thereon a pinion, a pair of concentric tubular shafts in alignment with said drive shaft, a sun gear on the innermost end of each of said tubular shafts, a planet carrier adapted for rotation on the outermost of said tubular shafts, said planet carrier having three interconnected planet pinions, one of which meshes with the pinion on said drive shaft, a transmission drum keyed to said outermost tubular shaft, braking means, the braking means and transmission drum being positioned in overlapped relation, said braking means being adapted selectively to control the rotation of said planet carrier or said transmission drum, a driven shaft having tubular portions overlapping both of said tubular shafts, and a clutch for selectively connecting said driven shaft to either of said tubular shafts.

6. A driving shaft, a driven shaft having a sleeve provided with ball apertures, two members concentric with the sleeve and having depressions adapted to receive said balls, means to drive the two members from the driving shaft at different speeds, and cam means for forcing the balls into the depressions in either of the two members.

7. In a transmission mechanism including a driving shaft having a pinion thereon, said driving shaft being adapted to be driven by a source of power, a planet carrier having three inter-connected planet pinions, one of which meshes with the pinion on the driving shaft, two sun gears meshing with the other planet pinions, of a high speed driving mechanism comprising a tubular extension projecting from the planet carrier, clutching means in said extension for controlling the rotation of the planet carrier to provide for high speed drive, said clutching means comprising a band, a cam adapted to engage said band, a rod for operating said cam, pivoted means for operating said rod, slidable means for operating said pivoted means, a driven shaft, and a clutch for connecting either of the sun gears to the driven shaft.

8. In a transmission mechanism including a driving shaft, a driven shaft, a planet carrier, interconnected planet pinions and sun gears associated with said shafts and said planet carrier for communicating the movement of said driving shaft to said driven shaft, a clutch for controlling said pinions and said gears, of a high speed driving mechanism comprising a tubular extension projecting from said planet carrier, clutching means in said extension for controlling the rotation of said planet carrier for high speed drive only, cam and pawl means for operating said clutching means, and a slidable cam sleeve for actuating said cam and pawl means.

In testimony whereof I have signed my name to this specification.

ARNOLD H. JESSEN.